United States Patent

Moon (10) Patent No.: US 10,771,557 B2
(45) Date of Patent: Sep. 8, 2020

(54) VEHICLE, SERVER, TELEMATICS SYSTEM INCLUDING THE SAME, AND VEHICLE REMOTE CONTROL METHOD

(71) Applicant: Hyundai Motor Company, Seoul (KR)

(72) Inventor: Sunghwan Moon, Incheon (KR)

(73) Assignee: Hyundai Motor Company, Seoul (KR)

( * ) Notice: Subject to any disclaimer, the term of this patent is extended or adjusted under 35 U.S.C. 154(b) by 66 days.

(21) Appl. No.: 15/459,244

(22) Filed: Mar. 15, 2017

(65) Prior Publication Data

US 2018/0131768 A1 May 10, 2018

(30) Foreign Application Priority Data

Nov. 9, 2016 (KR) .......................... 10-2016-0148835

(51) Int. Cl.
| | |
|---|---|
| *H04L 29/08* | (2006.01) |
| *H04W 52/02* | (2009.01) |
| *H04W 72/04* | (2009.01) |
| *H04W 84/18* | (2009.01) |

(52) U.S. Cl.
CPC ............ *H04L 67/12* (2013.01); *H04W 52/02* (2013.01); *H04W 72/0473* (2013.01); *H04W 84/18* (2013.01); *Y02D 70/00* (2018.01); *Y02D 70/1262* (2018.01); *Y02D 70/142* (2018.01); *Y02D 70/144* (2018.01); *Y02D 70/162* (2018.01); *Y02D 70/164* (2018.01); *Y02D 70/166* (2018.01); *Y02D 70/20* (2018.01); *Y02D 70/22* (2018.01)

(58) Field of Classification Search
None
See application file for complete search history.

(56) References Cited

U.S. PATENT DOCUMENTS

| | | | | | |
|---|---|---|---|---|---|
| 5,627,528 | A | * | 5/1997 | Kuznicki | ............ H04W 84/025 340/7.22 |
| 9,444,892 | B1 | * | 9/2016 | Amireddy | ............... H04W 4/12 |
| 2007/0155421 | A1 | * | 7/2007 | Alberth | ............. H04B 7/18508 455/553.1 |
| 2010/0196748 | A1 | | 8/2010 | Ellwanger | |
| 2011/0112969 | A1 | * | 5/2011 | Zaid | ....................... G06Q 10/02 705/50 |
| 2011/0181106 | A1 | * | 7/2011 | Kim | .................. H04W 52/0277 307/9.1 |
| 2012/0089298 | A1 | * | 4/2012 | Peariso | ............... H04L 41/0681 701/33.4 |

(Continued)

FOREIGN PATENT DOCUMENTS

| | | |
|---|---|---|
| KR | 20-2011-0011336 U | 12/2011 |
| KR | 10-1101309 B1 | 1/2012 |
| KR | 10-1475923 B1 | 12/2014 |

*Primary Examiner* — Andre Tacdiran
(74) *Attorney, Agent, or Firm* — Morgan, Lewis & Bockius LLP (57) ABSTRACT

A vehicle may include a telematics terminal configured to be turned off when a power level of a battery reaches a predetermined reference value; and a low-power communication module configuring a node of an Ad-hoc network, and configured to receive a remote control signal for the vehicle through the Ad-hoc network, wherein when the low-power communication module receives the remote control single for the vehicle through the Ad-hoc network in the state in which the telematics terminal is turned off, the telematics terminal is turned on.

11 Claims, 6 Drawing Sheets

(56) References Cited

U.S. PATENT DOCUMENTS

| | | | | |
|---|---|---|---|---|
| 2012/0106658 A1* | 5/2012 | Muth | H04W 52/0212 |
| | | | | 375/259 |
| 2012/0215403 A1* | 8/2012 | Tengler | B60W 50/12 |
| | | | | 701/36 |
| 2014/0125490 A1* | 5/2014 | Ullrich | B65F 1/141 |
| | | | | 340/870.01 |
| 2014/0269466 A1* | 9/2014 | Owens | H04W 52/0206 |
| | | | | 370/311 |
| 2014/0340222 A1* | 11/2014 | Thornton | G08B 7/062 |
| | | | | 340/539.17 |
| 2016/0082952 A1* | 3/2016 | Kang | H04L 67/141 |
| | | | | 701/2 |
| 2016/0142888 A1* | 5/2016 | Moon | H04W 4/12 |
| | | | | 455/414.1 |
| 2017/0013559 A1* | 1/2017 | Sumitomo | H04L 67/12 |
| 2017/0108858 A1* | 4/2017 | Feng | G01S 19/02 |
| 2017/0206717 A1* | 7/2017 | Kuhnapfel | H04L 67/22 |
| 2017/0264987 A1* | 9/2017 | Hong | H04R 1/1025 |
| 2017/0353559 A1* | 12/2017 | Seo | G05D 1/0011 |
| 2018/0027364 A1* | 1/2018 | Shintani | H04W 4/38 |
| | | | | 701/2 |
| 2018/0062996 A1* | 3/2018 | Lei | H04L 43/028 |
| 2018/0124244 A1* | 5/2018 | Lee | H04M 3/5183 |

* cited by examiner

VEHICLE, SERVER, TELEMATICS SYSTEM INCLUDING THE SAME, AND VEHICLE REMOTE CONTROL METHOD

CROSS-REFERENCE TO RELATED APPLICATION

The present application claims the benefit of Korean Patent Application No. 10-2016-0148835, filed on Nov. 9, 2016 in the Korean Intellectual Property Office, the disclosure of which is incorporated herein by reference.

BACKGROUND OF THE INVENTION

Field of the Invention

Embodiments of the present invention relate to a vehicle, a server, telematics system, and a vehicle remote control method.

Description of Related Art

Telematics is a compound word of telecommunication and informatics, and defined as a next-generation information providing service for vehicle through a combination of the IT industry and the automotive industry.

A telematics service can provide various services, such as traffic and driving information, emergency management information, a remote vehicle diagnosis service, the Internet, etc., based on wireless communication technology and Global Positioning System (GPS) technology.

Remote control technology for vehicle based on the telematics technology is being developed. However, a telematics terminal for vehicle needs to maintain a connection to a mobile communication network, in order to receive remote control signals for vehicle that can be transmitted at an unspecified time, which may cause a problem related to the battery of the vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a vehicle of performing control according to a remote control signal transmitted from a server by receiving the remote control signal through a low-power communication module configuring an Ad-hoc network when a telematics terminal is turned off to turn on the telematics terminal.

It is another aspect of the present invention to provide a server of transmitting, when a message informing turning-off of a telematics terminal is received from a vehicle, a remote control signal to a low-power communication module configuring an Ad-hoc network.

Additional aspects of the disclosure will be set forth in part in the description which follows and, in part, will be obvious from the description, or may be learned by practice of the disclosure.

In accordance with one aspect of the present invention, a vehicle includes: a telematics terminal configured to be turned off when a power level of a battery reaches a predetermined reference value; and a low-power communication module configuring a node of an Ad-hoc network, and configured to receive a remote control signal for the vehicle through the Ad-hoc network, wherein when the low-power communication module receives the remote control single for the vehicle through the Ad-hoc network in the state in which the telematics terminal is turned off, the telematics terminal is turned on.

When the power level of the battery reaches the predetermined reference value, the telematics terminal transmits a message informing turning-off of the telematics terminal to a server, and when the telematics terminal receives an acknowledge message informing reception of the message from the server, the telematics terminal is turned off.

When the low-power communication module receives the remote control signal for the vehicle through the Ad-hoc network in the state in which the telematics terminal is turned off, the telematics terminal is turned on to perform control according to the remote control signal.

The telematics terminal is turned off when a predetermined time period elapses after the engine of the vehicle is turned off.

In accordance with one aspect of the present invention, a server includes: a communication device configured to receive a remote control signal for a vehicle, transmitted from a user terminal, and to transmit the remote control signal to the vehicle indicated by the remote control signal; and a controller configured to decide an Ad-hoc network including a low-power communication module of the vehicle as a node, and to control the communication device to transmit the remote control signal to the low-power communication module of the vehicle through the decided Ad-hoc network.

When the communication device receives a message informing turning-off of a telematics terminal from the vehicle, the controller controls the communication device to transmit the remote control signal through the Ad-hoc network.

When the communication device receives a message informing turning-off of a telematics terminal from the vehicle, the controller controls the communication device to transmit an acknowledge message informing reception of the message to the telematics terminal of the vehicle.

When the communication device receives no message informing turning-off of a telematics terminal, the controller controls the communication device to transmit the remote control signal to the telematics terminal of the vehicle through a commercialized wireless communication network.

In accordance with one aspect of the present invention, a telematics system includes: a user terminal configured to transmit a remote control signal for a vehicle; a vehicle including a low-power communication module configuring a node of an Ad-hoc network, and configured to receive the remote control signal for the vehicle through the Ad-hoc network; and a server configured to receive the remote control signal transmitted from the user terminal, and to transmit the remote control signal to the low-power communication module of the vehicle through the Ad-hoc network.

When a power level of a battery reaches a predetermined reference value, the vehicle turns off a telematics terminal of the vehicle.

When a power level of a battery reaches a predetermined reference value, the vehicle transmits a message informing turning-off of a telematics terminal of the vehicle to the server, and when the vehicle receives an acknowledge message informing reception of the message from the server, the vehicle turns off the telematics terminal.

When the low-power communication module receives the remote control signal for the vehicle through the Ad-hoc network in the state in which a telematics terminal of the vehicle is turned off, the vehicle turns on the telematics terminal to perform control according to the remote control signal.

When the server receives a message informing turning-off of a telematics terminal from the vehicle, the server transmits the remote control signal to the low-power communication module through the Ad-hoc network.

When the server receives a message informing turning-off of a telematics terminal from the vehicle, the server transmits an acknowledge message informing reception of the message to the telematics terminal of the vehicle.

When the server receives no message informing turning-off of a telematics terminal from the vehicle, the server transmits the remote control signal to the telematics terminal of the vehicle through a commercialized wireless communication network.

In accordance with one aspect of the present invention, a remote control method of a vehicle, includes: at a vehicle, turning off a telematics terminal when a power level of a battery reaches a predetermined reference value; at a server, receiving a remote control signal transmitted from a user terminal; at the server, transmitting the remote control signal to a low-power communication module of the vehicle through an Ad-hoc network including the low-power communication module of the vehicle as a node; and at the vehicle, turning on the telematics terminal of the vehicle when the low-power communication module of the vehicle receives the remote control signal.

The turning-off of the telematics terminal at the vehicle when the power level of the battery reaches the predetermined reference value includes: transmitting a message informing turning-off of the telematics terminal of the vehicle to the server when the power level of the battery reaches the predetermined reference value; and turning off the telematics terminal when an acknowledge message informing reception of the message is received from the server.

The transmitting of the remote control signal to the low-power communication module of the vehicle, at the server, through the Ad-hoc network including the low-power communication module of the vehicle as the node includes: at the server, when a message informing turning-off of the telematics terminal is received from the vehicle, transmitting an acknowledge message informing reception of the message to the telematics terminal of the vehicle; and at the server, transmitting the remote control signal to the low-power communication module of the vehicle through the Ad-hoc network.

The remote control method further includes, at the vehicle, performing control according to the remote control signal when the telematics terminal of the vehicle is turned on.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present specification describes the technical principle of the present invention and includes embodiments, to clarify the scope of right of the present invention and to enable one of ordinary skill in the art to embody the present invention. The embodiments included in this specification may be implemented in various ways.

Like numbers refer to like elements throughout this specification. This specification does not describe all components of the embodiments, and general information in the technical field to which the present invention belongs or overlapping information between the embodiments will not be described. The terms "part" and "portion", as used herein, may be implemented as software or hardware, and according to embodiments, a plurality of "parts" or "portions" may be implemented as a single component, or a single "part" or "portion" may include a plurality of components.

Also, it will be understood that when the terms "includes," "comprises," "including," and/or "comprising," when used in this specification, specify the presence of a stated component, but do not preclude the presence or addition of one or more other components.

It is to be understood that the singular forms "a," "an," and "the" include plural referents unless the context clearly dictates otherwise.

Reference numerals used in operations are provided for convenience of description, without describing the order of the operations, and the operations can be executed in a different order from the stated order unless a specific order is definitely specified in the context.

Hereinafter, the operation principle and embodiments of the present invention will be described with reference to the accompanying drawings.

Figure 1:
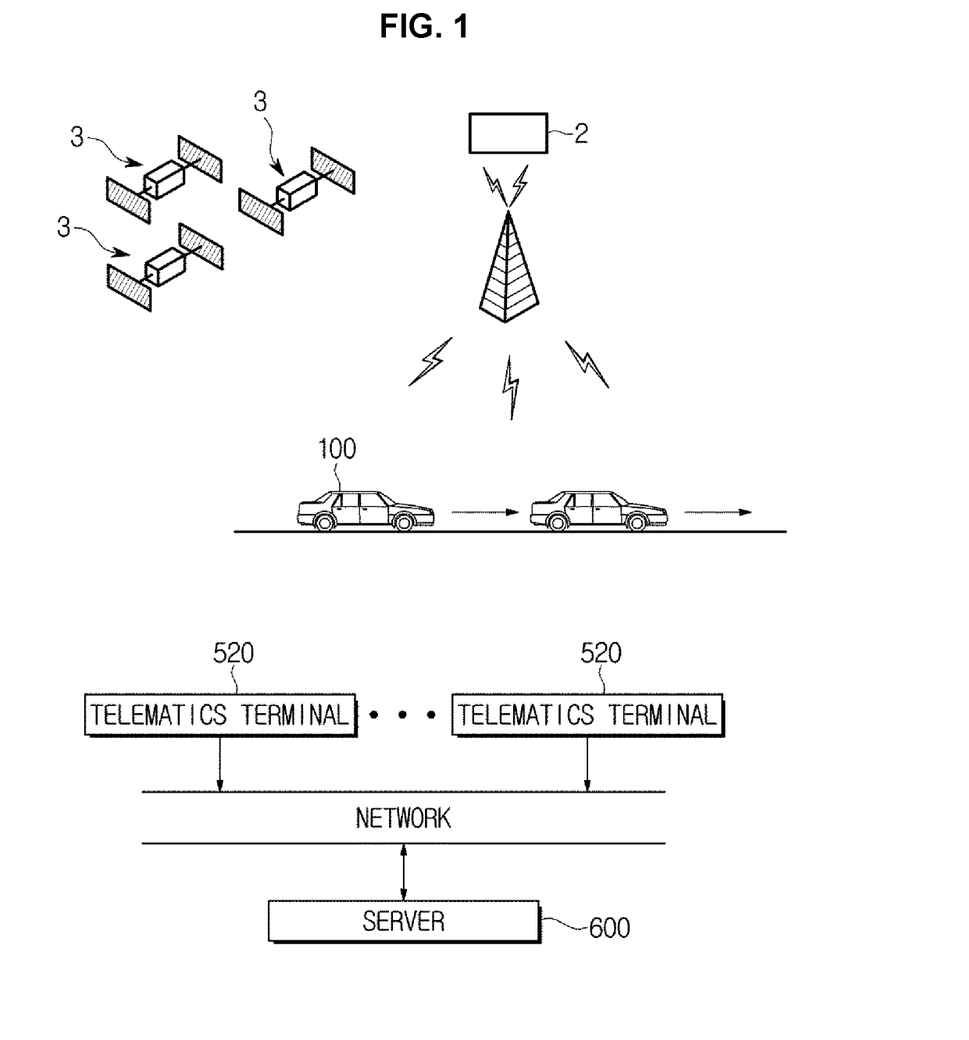
FIG. 1 shows a configuration of telematics system.

FIG. 1 shows a configuration of telematics system.

As shown in FIG. 1, telematics system according to an exemplary embodiment of the present invention may include a telematics terminal 520 disposed in a vehicle 100, and a server 600 disposed in a telematics center 2.

The telematics terminal 520 according to an exemplary embodiment of the present invention may be disposed in the vehicle 100 to communicate with the server 600 through a network. The telematics terminal 520 may be disposed in the vehicle 100, as described above, or may be implemented as one of various kinds of terminals that can communicate with the server 600 although it is not disposed in a vehicle. For example, the telematics terminal 520 may be implemented as a computer or a portable terminal that can connect to the server 600 through a network. Herein, the computer may include, for example, a notebook computer with a WEB browser, a desktop computer, a laptop computer, a tablet PC, a slate PC, and the like, and the portable terminal, which is, for example, a wireless communication apparatus ensuring portability and mobility, may include all kinds of Handheld-based wireless communication apparatuses including Personal Communication System (PCS), Global System for Mobile communications (GSM), Personal Digital Cellular (PDC), Personal Handyphone System (PHS), Personal Digital Assistant (PDA), International Mobile Telecommunication (IMT)-2000, Code Division Multiple Access (CDMA)-2000, W-Code Division Multiple Access (W-CDMA), a Wireless Broadband Internet (Wibro) terminal, a smart phone, and the like.

The telematics terminal 520 may include a communication device for communicating with the server 600, as described above, and the communication device may include one or more components. For example, the communication device may include a wireless communication module, and may additionally include at least one of a short-range communication module and a wired communication module.

The wireless communication module may include a Wireless-Fidelity (Wi-Fi) module, a Wibro module, and a wireless communication module supporting various wireless communication methods including GSM, CDMA, W-CDMA, Time Division Multiple Access (TDMA), Long Term Evolution (LTE), etc.

The wireless communication module may include a wireless communication interface including a communication port to connect a controller of the telematics terminal 520 to a network, a transmitter to transmit a signal for providing a telematics service, and a receiver to receive a signal related to provision of the telematics service. Also, the wireless communication module may further include a signal conversion module configured for modulating a digital control signal output from the controller through the wireless communication interface into an analog form of wireless signal, and demodulating an analog form of wireless signal received through the wireless communication interface into a digital control signal, according to the control of the controller. The controller may be included in the telematics terminal 520, and may be implemented with a memory to store data in a form of programs and algorithms for controlling the operations of the components of the telematics terminal 520, and a processor to perform the above-described operations using the data stored in the memory. The memory and the processor may be implemented as separate chips, or integrated into a single chip. The controller may be included in the telematics terminal 520, as described above, or may be provided outside the telematics terminal 520 to control the entire configurations of the vehicle 100.

The short-range communication module may include various kinds of short-range communication modules including a Bluetooth module, an infrared communication module, a Radio Frequency Identification (RFID) communication module, a Wireless Local Access Network (WLAN) communication module, a Near Field Communication (NFC) module, a Zigbee communication module, and the like, which transmit/receive signals through a wireless communication network at a short range.

The wired communication module may include various cable communication modules including a Universal Serial Bus (USB), a High Definition Multimedia Interface (HDMI), a Digital Visual Interface (DVI), and the like, as well as various kinds of wired communication modules including a Controller Area Network (CAN) communication module, a Local Area Network (LAN) module, a Wide Area Network (WAN) module, a Value Added Network (VAN) module, and the like.

Meanwhile, the telematics terminal 520 may receive GPS signals from at least three GPS satellites 3, and determine the current location of the vehicle 100 based on the GPS signals and map data. Also, when a path from the current location of the vehicle 100 to a destination is set, the telematics terminal 520 may transmit location information of the vehicle 1 on a map to the server 600. Also, the telematics terminal 520 may transmit driving video of the vehicle 100 stored in a storage device, as well as driving video of the vehicle 100 photographed by a black box or another photographing apparatus, to the server 600. As described above, the telematics terminal 520 may transmit various data related to the vehicle 100 to the server 600. The storage device may be included in the telematics terminal 520 or the vehicle 100. Also, the storage device may be external memory which is not included in the vehicle 100. The storage device may be implemented as at least one of a non-volatile memory device (for example, a cache, Read Only Memory (ROM), Programmable ROM (PROM), Erasable Programmable ROM (EPROM), Electrically Erasable Programmable ROM (EEPROM), and flash memory), a volatile memory device (for example, Random Access Memory (RAM)), or storage medium (for example, Hard Disk Drive (HDD) and Compact Disc Read Only Memory (CD-ROM)), although not limited to these. The storage device may be memory implemented as a separate chip from the above-described processor, or the storage device and the processor may be integrated into a single chip.

The server 600 may receive and store various data related to the vehicle 1 including driving video of the vehicle 100, from the telematics terminal 520 included in the vehicle 100, receive signals related to execution of a specific telematics service, and provide the telematics service related to the received signals. Also, the server 600 may receive a remote control signal for the vehicle 100, transmitted from a user terminal (see FIG. 4), and transmits the remote control signal to the telematics terminal 520 of the vehicle 100 to perform the remote control of the vehicle 100.

When the vehicle 100 is located in a place including an airport, a vehicle storage yard, and a harbor, where vehicles can stay for a long time, the remote control of the vehicle 100 may have time limitation. For the remote control of the vehicle 100, the telematics terminal 520 of the vehicle 100 may need to maintain a connection to a wireless communication network 410 (see FIG. 4, also referred to as a commercial network), and to maintain a connection to the wireless communication network 410, it is necessary to continuously supply power to the telematics terminal 520 even after the engine is turned off, to prevent a battery 700 of the vehicle 100 from being discharged, when a predetermined time period elapses, for example, when 96 hours elapse after the engine of the vehicle 100 is turned off, power may be no longer supplied to the telematics terminal 520. When power is not supplied to the telematics terminal 520, the remote control or telematics function of the vehicle 100 may be disabled until the vehicle 100 starts again.

To overcome the problem, according to an exemplary embodiment of the present invention, there are provided a vehicle and telematics system configured for receiving a remote control signal through an Ad-hoc network including a low-power communication module n5 as a node when power is no longer supplied to the telematics terminal 520. Hereinafter, the embodiment will be described in detail with reference to FIGS. 2 to 6.

Figure 2:
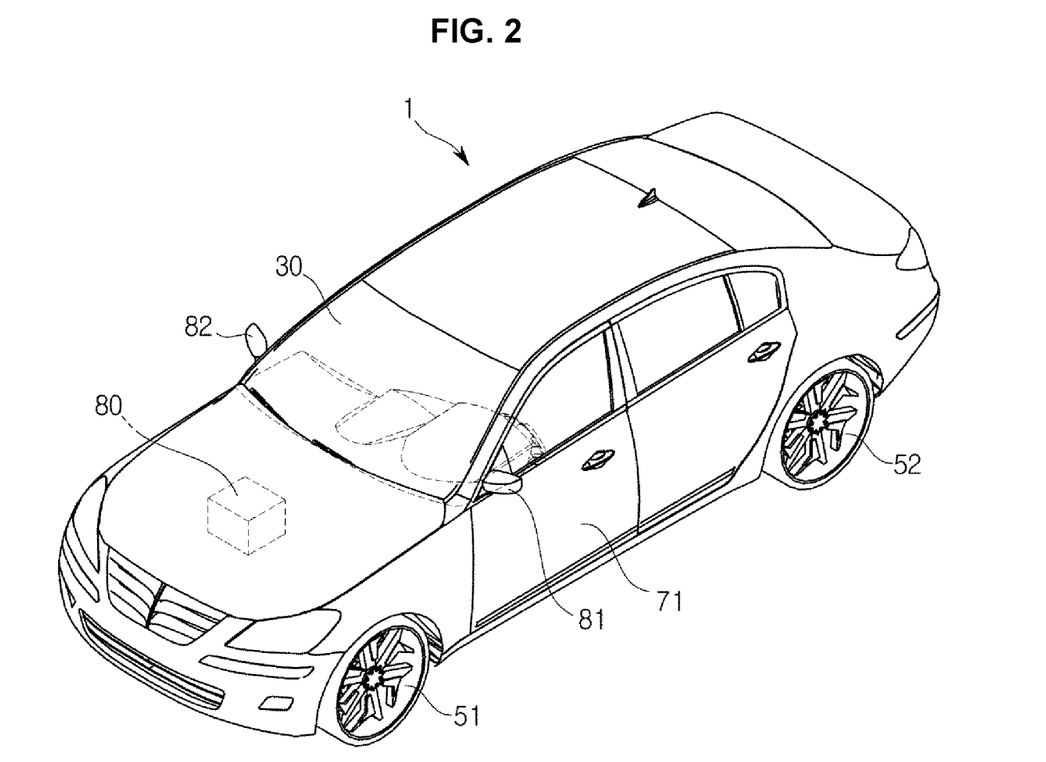
FIG. 2 shows the external appearance of a vehicle according to an exemplary embodiment of the present invention.
Figure 3:
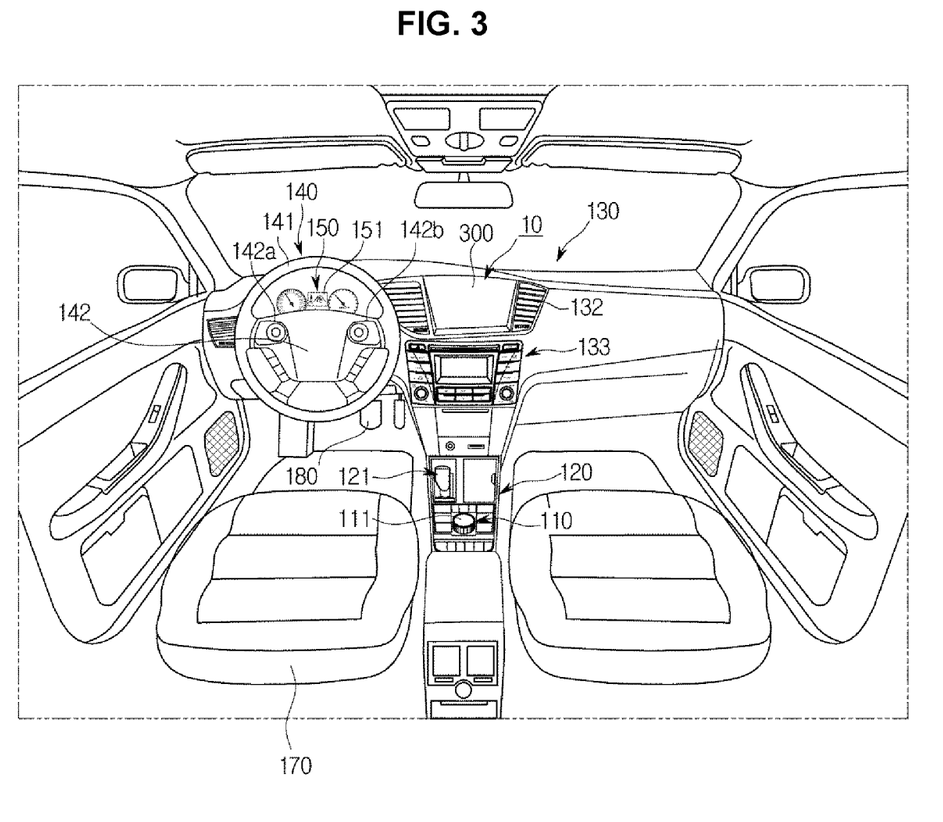
FIG. 3 shows the internal of a vehicle according to an exemplary embodiment of the present invention.

FIG. 2 shows the external appearance of a vehicle according to an exemplary embodiment of the present invention, and FIG. 3 shows the internal of a vehicle according to an exemplary embodiment of the present invention.

Referring to FIG. 2, the vehicle 100 according to an exemplary embodiment of the present invention may include a main body 1 forming the external appearance of the vehicle 100, wheels 51 and 52 to move the vehicle 100, a driving apparatus 80 to rotate the wheels 51 and 52, doors 71 to shield the internal of the vehicle 100 from the outside, a front glass 30 to provide a driver inside the vehicle 100 with a front view of the vehicle 100, and side-view mirrors 81 and 82 to provide the driver with rear views of the vehicle 100.

The wheels 51 and 52 may include front wheels 51 provided in the front portion of the vehicle 100, and rear wheels 52 provided in the rear portion of the vehicle 100.

The driving apparatus 80 may provide rotatory power to the front wheels 51 or the rear wheels 52 so that the main body 1 moves forward or backward. The driving apparatus 80 may include an engine to burn fossil fuel to produce rotatory power, or a motor to receive power from the battery 700 or a fuel cell to produce rotatory power. When the driving apparatus 80 includes a motor, the driving apparatus 80 may include an inverter to control rotation of the motor.

The doors 71 may be rotatably provided to the left and right of the main body 1 to allow the driver to open one of them and get into the vehicle 100. Also, the doors 71 may shield the internal of the vehicle 100 from the outside when all of them close.

The front glass 30, which is also called a windshield glass, may be provided in the upper, front part of the main body 1 to allow the driver inside the vehicle 100 to acquire a front view of the vehicle 100 through the front glass 30. Also, the side-view mirrors 81 and 82 may include a left side-view mirror 81 provided to the left of the main body 1 and a right side-view mirror 82 provided to the right of the main body 1 to allow the driver inside the vehicle 100 to see side and rear situations of the vehicle 10 with his/her eyes through the side-view mirrors 81 and 82.

Also, the vehicle 100 may include various sensors to sense an obstacle, etc. around the vehicle 100 to help the driver recognize surroundings around the vehicle 100. Also, the vehicle 100 may include various sensors configured for detecting driving information of the vehicle 1 including the speed of the vehicle 100. Also, the vehicle 100 may include a sensor to acquire images about surroundings (for example, lanes) around the vehicle 100.

Referring to FIG. 3, the vehicle 100 may include a dashboard including a gearbox 120, a center fascia 130, a steering wheel 140, an instrument panel 150, etc.

In the gearbox 120, a gear lever 121 for changing gears may be disposed. Also, as shown in FIG. 3, in the gear box 120, a dial manipulator 111 to enable a user to control the execution of the functions of multimedia system including navigation system 10 or audio system 133 or the main functions of the vehicle 100, and an input device 110 including various buttons may be disposed. In the center fascia 130, an air conditioner 132, the audio system 133, the navigation system 10, etc. may be disposed.

The air conditioner 132 may adjust the temperature, humidity, air quality, and flow of air inside the vehicle 100 to maintain the inside of the vehicle 100 pleasant. The air conditioner 132 may be disposed in the center fascia 130, and may include at least one vent for discharging air. In the center fascia 130, at least one button or dial for controlling the air conditioner 132, etc. may be provided. A user including a driver may use the button or dial provided on the center fascia 130 to control the air conditioner 132 of the vehicle 100. Also, the user may control the air conditioner 132 through the buttons of the input device 110 disposed in the gear box 120 or through the dial manipulator 111.

According to an embodiment, the navigation system 10 may be disposed in the center fascia 130. The navigation system 10 may be embedded in the center fascia 130 of the vehicle 100. According to an embodiment, the center fascia 130 may include an input device for controlling the navigation system 10. According to another example, the input device of the navigation system 10 may be disposed at another location, instead of the center fascia 130. For example, the input device of the navigation system 10 may be disposed around a display 300 of the navigation system 10. According to still another example, the input device of the navigation system 10 may be disposed in the gear box 120.

The steering wheel 140, which is an apparatus for changing the driving direction of the vehicle 100, may include a rim 141 that is gripped by the driver, and a spoke 142 connected to a steering apparatus of the vehicle 100 and connecting the rim 141 to a hub of a rotation shaft for steering. According to an embodiment, the spoke 142 may include manipulators 142a and 142b to control various apparatuses (for example, the audio system 133) in the vehicle 100. Also, in the dashboard, an instrument panel 150 may be disposed to display speed, Revolutions Per Minute (RPM), and fuel gauge of the vehicle 100. The instrument panel 150 may include an instrument panel display 151 to display information related to the state and driving of the vehicle 100, information related to manipulation of the multimedia system, etc.

The driver may manipulate the above-described various apparatuses disposed on the dashboard to drive the vehicle 100.

Figure 4:
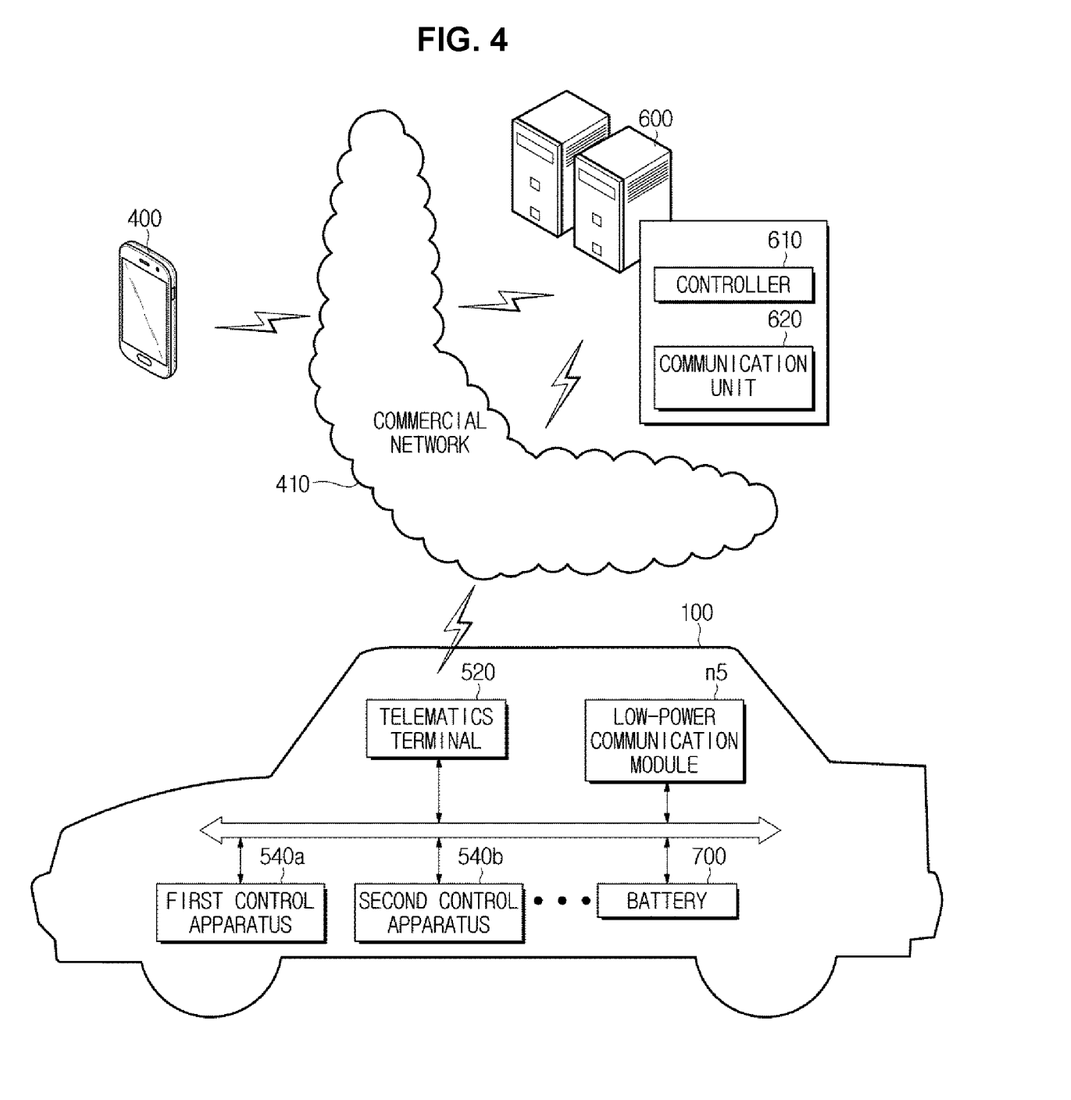
FIG. 4 and FIG. 5 are views for describing the technical concept of a vehicle remote control method of telematics system according to an exemplary embodiment of the present invention.
Figure 5:
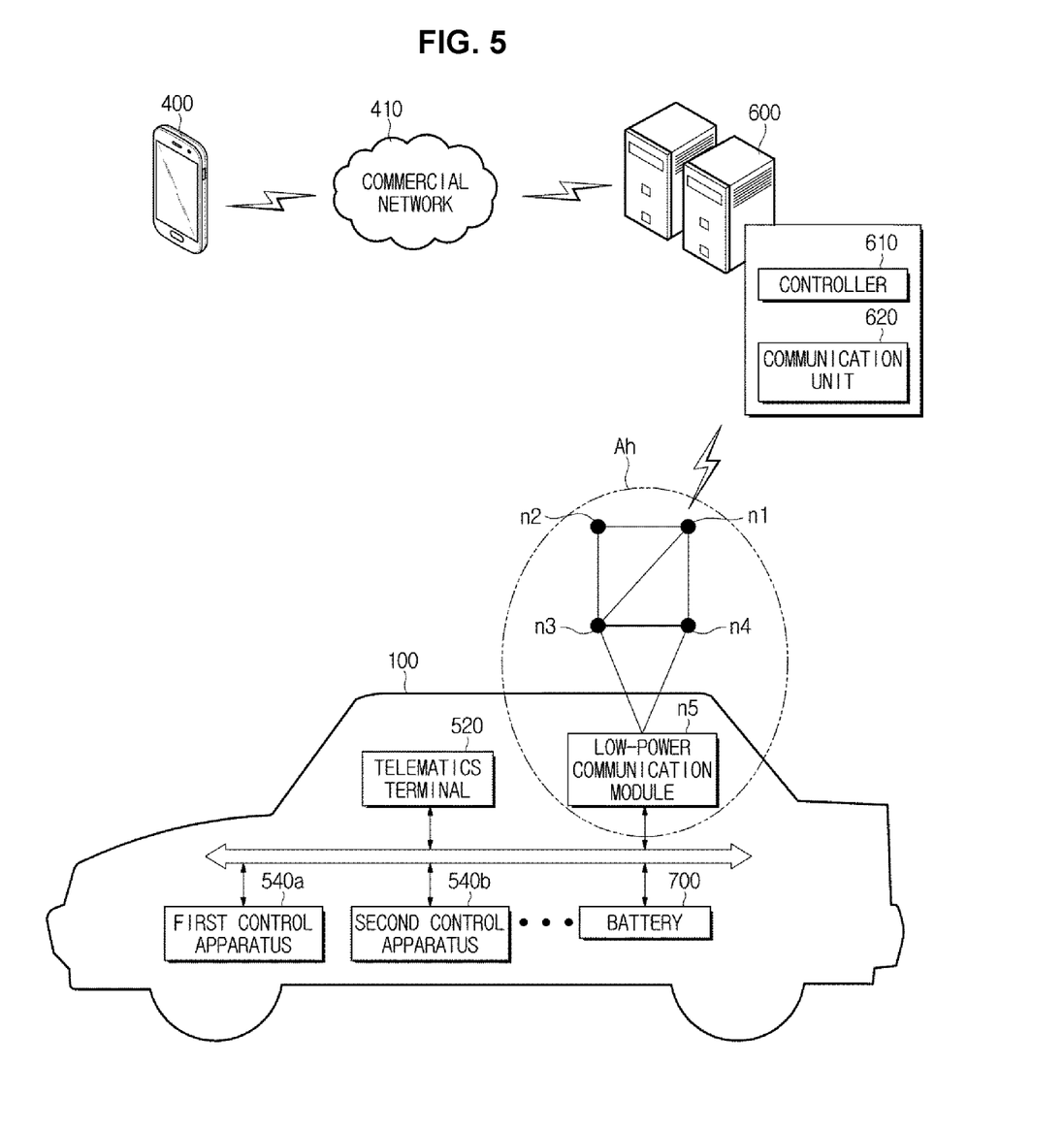
Figure 6:
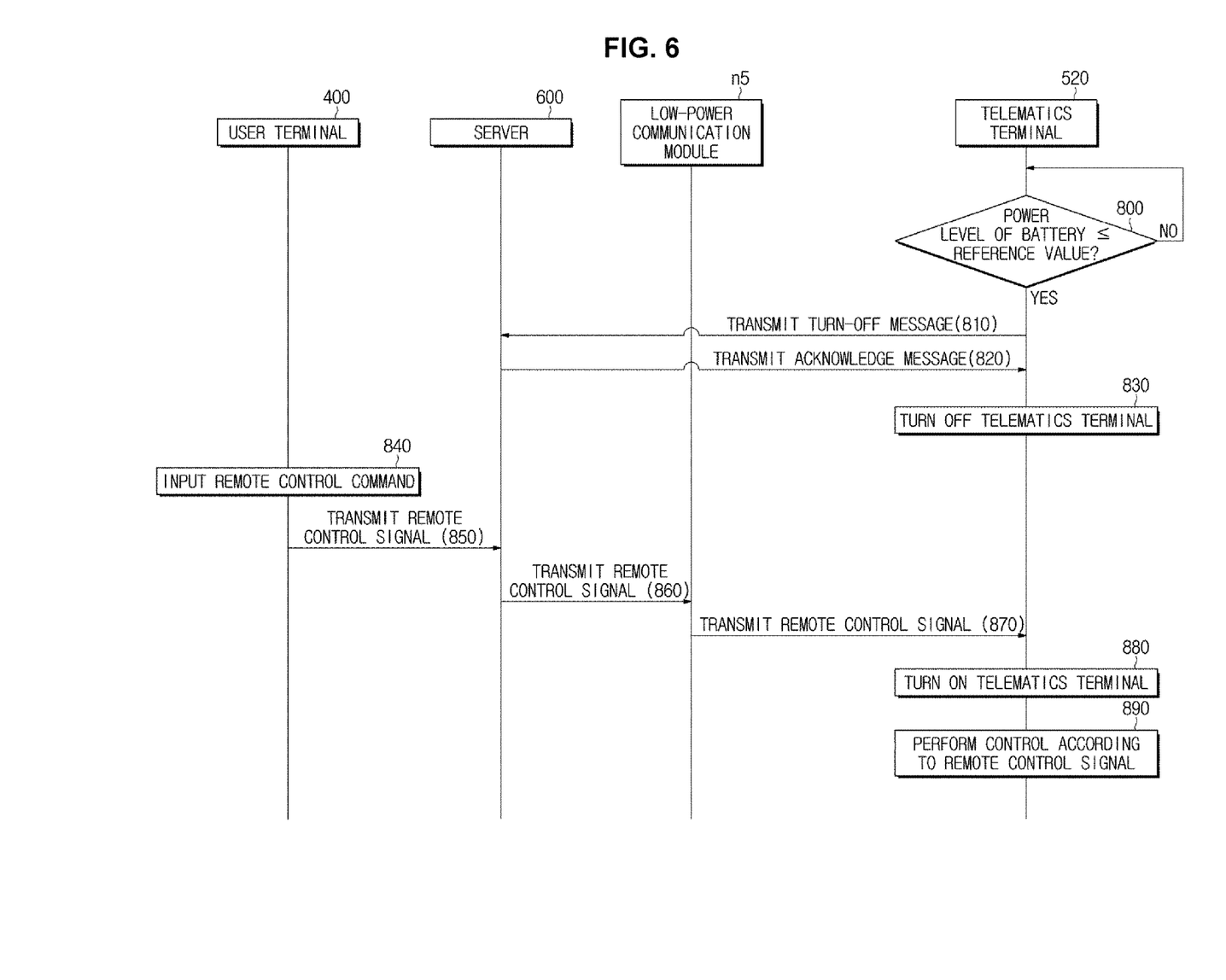
FIG. 6 is a flowchart illustrating the vehicle remote control method of the telematics system according to an exemplary embodiment of the present invention.

FIG. 4 and FIG. 5 are views for describing the technical concept of a vehicle remote control method of telematics system according to an exemplary embodiment of the present invention, and FIG. 6 is a flowchart illustrating the vehicle remote control method of the telematics system according to an exemplary embodiment of the present invention.

Referring to FIG. 4 and FIG. 5, telematics system according to an exemplary embodiment of the present invention may include the user terminal 400 configured to receive a remote control command input by a user, and to transmit a remote control signal corresponding to the received remote control command to the server 600, the server 600 configured to transmit the remote control signal received from the user terminal 400 to the vehicle 100, and the vehicle 100 configured to receive the remote control signal transmitted from the server 600, and to perform control according to the remote control signal.

The user terminal 400 may include a wireless communication apparatus for enabling data communication with the server 600, for example, all kinds of Handheld-based wireless communication apparatuses including a smart phone. Also, an application for providing various functions related to the remote control of the vehicle 100 may be disposed in the user terminal 400. The user terminal 400 may communicate with the server 600 through a commercialized wireless network 410 (also, simply referred to as a commercial network). For example, the commercial network 410 may support various wireless communication methods including Wi-Fi, Wibro, GSM, CDMA, W-CDMA, TDMA, LTE, etc.

The server 600 may include a communication device 620 to communicate with the user terminal 400 and the vehicle 100, and a controller 610 to decide a route for transmitting a remote control signal to the vehicle 100 according to whether the telematics terminal 520 of the vehicle 100 is turned off. The server 600 may determine whether to transmit a remote control signal to the telematics terminal 520 through the commercial network 410 or to a low-power communication module n5 of the vehicle 100 through an Ad-hoc network Ah including the low-power communication module n5 as a node, according to whether the telematics terminal 520 is turned off.

The vehicle 100 may include the telematics terminal 520, a plurality of control apparatuses (for example, a first control apparatus 540*a* and a second control apparatus 540*b*) that can be controlled according to a remote control signal received by the telematics terminal 520, the battery 700 configured to supply power to the telematics terminal 520, and the low-power communication module n5 configured to receive the remote control signal when the telematics terminal 520 is turned off. The control apparatuses 540*a* and 540*b* may receive the remote control signal from the telematics terminal 520, and output an electrical signal corresponding to the remote control signal to an electronic apparatus of the vehicle 100. For example, the first control apparatus 540*a* may be an engine control module, and the engine control module may perform fuel-injection control, fuel ratio feedback control, lean-burn control, ignition timing control, idling control, etc. Also, the second control apparatus 540*b* may be a power transfer control module, and the power transfer control module may perform transmission control, damper clutch control, pressure control upon the turning-on/off of a friction clutch, engine torque control during gear-shifting, etc.

The telematics terminal 520 may receive power from the battery 700 for a predetermined time period even after the engine of the vehicle 100 is turned off to maintain the connection to the commercial network 410, as described above.

As shown in FIG. 4, when the telematics terminal 520 receives power to be turned on, the server 600 may transmit a remote control signal to the telematics terminal 520 through the commercial network 410. When the telematics terminal 520 receives the remote control signal transmitted from the server 600 through the commercial network 410, the telematics terminal 520 may decide a control apparatus related to a controlled target of the remote control signal, and output the remote control signal to the decided control apparatus to perform control according to the remote control signal.

Meanwhile, the telematics terminal 520 may monitor the power level of the battery 700, and cut off power supplied from the battery 700 when the power level of the battery is smaller than or equal to a predetermined reference value to thus be turned off. That is, when a predetermined time period elapses after the engine of the vehicle 100 is turned off, or when the power level of the battery 700 is smaller than or equal to a predetermined reference value, the telematics terminal 520 may be turned off.

When the power level of the battery 700 is smaller than or equal to the predetermined reference value, the telematics terminal 520 may transmit a message informing that communication through the commercial network 410 stops due to the turning-off of the telematics terminal 520.

When the server 600 receives the message transmitted from the telematics terminal 520, the server 600 may transmit an acknowledge message informing the reception of the message to the telematics terminal 520. When the telematics terminal 520 receives the acknowledge message transmitted from the server 600, the telematics terminal 520 may cut off power supplied from the battery 700 to be turned off.

When the server 600 receives a remote control signal from the user terminal 400, the server 600 may determine whether the message has been received from the telematics terminal 520. When the server 600 determines that the message has been received, the server 600 may transmit the remote control signal through the Ad-hoc network Ah including the low-power communication module n5 of the vehicle 100 as a node, instead of the commercial network 410.

The low-power communication module n5 of the vehicle 100 may include a low-power short-range communication module, for example, a Zigbee communication module n5. Since the low-power communication module n5 can continue to communicate with the outside with minimum consumption of the battery 700, the low-power communication module n5 can receive a remote control signal transmitted from the server 600 even after the telematics terminal 520 is turned off.

The low-power communication module n5 of the vehicle 100 may configure a node of the Ad-hoc network Ah, together with various adjacent communication modules enabling short-range communication. The server 600 may decide the location of the vehicle 100 that has transmitted the message informing the turning-off of the telematics terminal 520, to transmit a remote control signal to the vehicle 100 that has transmitted the message informing the turning-off of the telematics terminal 520. The server 600 may decide an infra network managing the Ad-hoc network Ah including the low-power communication module n5 of the vehicle 100 as a node, based on the decided location of the vehicle 100, and transmit a remote control signal to the decided infra network.

As described above, the remote control signal transmitted from the server 600 may be transmitted to the Ad-hoc network Ah through the infra network. As shown in FIG. 5, the remote control signal may be transmitted to the low-power communication module n5 of the target vehicle 100 via a plurality of nodes configuring the Ad-hoc network Ah.

When the remote control signal transmitted through the Ad-hoc network Ah is received by the low-power communication module n5, the low-power communication module n5 may output the remote control signal to the telematics terminal 520 to turn on the telematics terminal 520. When the telematics terminal 520 is turned on, the telematics terminal 520 may transmit the remote control signal to the target control apparatus 540 according to the remote control signal output from the low-power communication module n5 to perform control according to the remote control signal.

When the remote control signal is received through the low-power communication module n5, it is possible to lower the possibility of discharge of the battery 700, and to perform remote control even in a place where vehicles can stay for a long time during two years or more which are significantly longer than 96 hours according to the above-described example.

Hereinafter, a remote control method of a vehicle will be described with reference to FIG. 6.

Referring to FIG. 6, when the power level of the battery 700 is smaller than or equal to a predetermined reference value, in operation 800, the telematics terminal 520 may transmit a message informing turning-off of the telematics terminal 520 to the server 600, in operation 810. When the server 600 may receive the message from the telematics terminal 520, the server 600 may transmit an acknowledge message informing the reception of the message to the telematics terminal 520, in operation 820. When the telematics terminal 520 receives the acknowledge message, the telematics terminal 520 may be turned off, in operation 830.

The telematics terminal 520 may monitor the power level of the battery 700, and when the power level of the battery 700 is smaller than or equal to the predetermined reference value, the telematics terminal 520 may cut off power supplied from the battery 700 to be turned off. When the power level of the battery 700 is smaller than or equal to the predetermined reference value, the telematics terminal 520 may transmit a message informing that communication through the commercial network 410 stops due to the turning-off of the telematics terminal 520, to the server 600.

When the server 600 receives the message transmitted from the telematics terminal 520, the server 600 may transmit an acknowledge message informing the reception of the message to the telematics terminal 520. When the telematics terminal 520 receives the acknowledge message transmitted from the server 600, the telematics terminal 520 may cut off power supplied from the battery 700 and then be turned off.

When a remote control command is input to the user terminal 400 in the state in which the telematics terminal 520 is turned off, in operation 840, the user terminal 400 may transmit a remote control signal corresponding to the remote control command to the server 600, in operation 850, and the server 600 may transmit the remote control signal to the low-power communication module n5 through the Ad-hoc network Ah, in operation 860.

When the server 600 receives the remote control signal from the user terminal 400, the server 600 may determine whether the message has been received from the telematics terminal 520, and when the server 600 determines that the message has been received from the telematics terminal 520, the server 600 may transmit the remote control signal through the Ad-hoc network Ah including the low-power communication module n5 of the vehicle 100 as a node, instead of the commercial network 410.

The low-power communication module n5 of the vehicle 100 may include a low-power short-range communication module, for example, a Zigbee communication module. Since the low-power communication module n5 can continue to communicate with the outside with minimum consumption of the battery 700, the low-power communication module n5 can receive a remote control signal transmitted from the server 600 even after the telematics terminal 520 is turned off.

The low-power communication module n5 of the vehicle 100 may configure a node of the Ad-hoc network Ah, together with various adjacent communication modules enabling short-range communication. The server 600 may decide the location of the vehicle 100 that has transmitted the message informing the turning-off of the telematics terminal 520, to transmit the remote control signal to the vehicle 100 that has transmitted the message informing the turning-off of the telematics terminal 520. The server 600 may decide an infra network managing the Ad-hoc network Ah including the low-power communication module n5 of the vehicle 100 as a node, based on the decided location of the vehicle 100, and transmit the remote control signal to the decided infra network.

As described above, the remote control signal transmitted from the server 600 may be transmitted to the Ad-hoc network Ah through the infra network. As shown in FIG. 5, the remote control signal may be transmitted to the low-power communication module n5 of the target vehicle 100 via a plurality of nodes configuring the Ad-hoc network Ah.

The low-power communication module n5 may output the remote control signal to the telematics terminal 520, in operation 870, and when the telematics terminal 520 receives the remote control signal, the telematics terminal 520 may be turned on in operation 880, to perform control according to the remote control signal, in operation 890.

When the remote control signal transmitted through the Ad-hoc network Ah is received by the low-power communication module n5, the low-power communication module n5 may output the remote control signal to the telematics terminal 520 to turn on the telematics terminal 520. When the telematics terminal 520 is turned on, the telematics terminal 520 may transmit the remote control signal to the target control apparatus 540 according to the remote control signal output from the low-power communication module n5 to perform control according to the remote control signal.

According to the embodiments of the present invention as described above, it is possible to perform the remote control of the vehicle even in a place including an airport, a vehicle storage yard, a harbor, etc., where the vehicle can stay for a long time so that the battery may be discharged.

Also, it is possible to increase the remote control time of the vehicle, and to reduce the costs for addition of battery.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle for communicating with a server, the vehicle comprising:
   a telematics terminal comprising a wireless communication module configured to communicate with the server through a commercialized wireless communication network; and
   a low-power communication module-, wherein the low-power communication module configure a node of an Ad-hoc network, and is configured to:
      receive, from the server, the remote control signal for the vehicle through the Ad-hoc network;
      responsive to determining that the low-power communication module receives the remote control signal for the vehicle through the Ad-hoc network in a state in which the telematics terminal is turned off, instruct the telematics terminal to turn on, and
   wherein the telematics terminal is configured to turn off by:
      responsive to determining that a power level of a battery reaches a predetermined reference value, transmits a message informing turning-off of the telematics terminal to the server, and
      responsive to receiving, from the server, an acknowledge message informing reception of the message, turn off,
   wherein the server is configured to:
      upon receiving the remote signal from a communication device, determine whether the server received the message informing turning-off of the telematics terminal from the vehicle;
      responsive to determining that the server received the message informing turning-off of the telematics terminal from the vehicle, transmit the remote control signal to the vehicle through the Ad-hoc network; and
         responsive to determining that the server received no message informing turning-off of the telematics terminal from the vehicle, transmit the remote control signal to the telematics terminal of the vehicle through the commercialized wireless communication network.

2. The vehicle according to claim 1,
   wherein responsive to determining that the low-power communication module receives the remote control signal for the vehicle through the Ad-hoc network in the state in which the telematics terminal is turned off, the telematics terminal is configured to be turned on to perform control according to the remote control signal.

3. The vehicle according to claim 1,
   wherein the telematics terminal is turned off responsive to determining that a predetermined time period elapses after an engine of the vehicle is turned off.

4. A server comprising:
   a communication device configured to:
      receive a remote control signal for a vehicle, transmitted from a user terminal and;
      transmit the remote control signal to the vehicle indicated by the remote control signal through a commercialized wireless communication network or through an Ad-hoc network,
   wherein the vehicle uses a wireless communication module of a telematic terminal to communicate over the commercialized wireless communication network and uses a low-power communication module to communicate over the Ad-hoc network;
   a processor;
   a non-transitory computer-readable storage device storing instructions which, when executed by the processor, cause the processor to perform operations comprising:
      responsive to receiving the remote control signal for the vehicle, determining whether the communication device has received, from the vehicle, a message informing turning-off of the telematics terminal;
      responsive to determining that the communication device has received the message informing turning-off of the telematics terminal from the vehicle, controlling the communication device to transmit the remote control signal to the low-power communication module of vehicle through the Ad-hoc network;
      responsive to determining that the communication device has received no message informing turning-off of the telematics terminal, controlling the communication device to transmit the remote control signal to the wireless communication module of the telematics terminal through the commercialized wireless communication network; and
      transmitting an acknowledge message to the telematics terminal, wherein upon receipt of the acknowledge message, the telematics terminal turns off,
   wherein responsive to determining that the low-power communication module receives the remote control signal for the vehicle through the Ad-hoc network in a state in which a telematics terminal is turned off, the telematics terminal is turned on.

5. The server according to claim 4,
   wherein responsive to determining that the communication device receives the message informing turning-off of the telematics terminal from the vehicle, the processor is configured to control the communication device to transmit the acknowledge message informing reception of the message to the telematics terminal of the vehicle.

6. A telematics system comprising:
   a server configured to communicate with a vehicle through a commercialized wireless communication network and through an Ad-hoc network;
   a telematics terminal comprising a wireless communication module configured to communicate with the server through the commercialized wireless communication network, wherein the telematics terminal is configured to be turned off in response to a power level of a battery reaching a predetermined reference value; and
   a user terminal configured to transmit a remote control signal for the vehicle;
   the vehicle including a low-power communication module
configuring a node of an Ad hoc network, and
configured to receive the remote control signal for the vehicle through the Ad-hoc network,
   wherein the server is further configured to:
      upon receiving the remote signal from the user terminal, determine whether the server received a message informing turning-off of the telematics terminal from the vehicle;
      responsive to determining that the server receives no message informing turning-off of the telematics terminal from the vehicle, transmit the remote control signal to the telematics terminal of the vehicle through the commercialized wireless communication network; and
      responsive to determining that the server received the message informing turning-off of the telematics terminal from the vehicle, transmit the remote control signal to the low-power communication module of the vehicle through the Ad-hoc network, wherein responsive to determining that the low-power communication module receives the remote control signal for the vehicle through the Ad-hoc network in a state in which the telematics terminal is turned off, the telematics terminal is turned on, wherein responsive to determining that the power level of the battery reaches the predetermined reference value, the vehicle is configured to transmit the message informing turning-off of the telematics terminal of the vehicle to the server, and wherein responsive to determining that the vehicle receives an acknowledge message informing reception of the message from the server, the vehicle turns off the telematics terminal.

7. The telematics system according to claim 6, wherein responsive to determining that the low-power communication module receives the remote control signal for the vehicle through the Ad-hoc network in a state in which the telematics terminal of the vehicle is turned off, the vehicle turns on the telematics terminal to perform control according to the remote control signal.

8. The telematics system according to claim 6, wherein responsive to determining that the server receives the message informing turning-off of the telematics terminal from the vehicle, the server transmits the acknowledge message informing reception of the message to the telematics terminal of the vehicle.

9. A remote control method of a vehicle, the method comprising:

at the vehicle, turning off a telematics terminal responsive to a power level of a battery reaching a predetermined reference value;

at a server, receiving a remote control signal transmitted from a user terminal;

at the server, responsive to receiving the remote control signal from the user terminal, determining whether the server has received, from the vehicle, a message informing turning-off of the telematics terminal;

at the server, responsive to determining that the server has received the message informing turning-off of the telematics terminal from the vehicle, transmitting the remote control signal to a low-power communication module of the vehicle through an Ad-hoc network including the low-power communication module of the vehicle as a node;

at the server, responsive to determining that the communication device has received no message informing turning-off of the telematics terminal, transmitting the remote control signal to the telematics terminal of the vehicle through a commercialized wireless communication network;

at the vehicle, turning on the telematics terminal of the vehicle responsive to determining that the low-power communication module of the vehicle receives the remote control signal, wherein the turning-off of the telematics terminal at the vehicle responsive to determining that the power level of the battery reaches the predetermined reference value comprises:

transmitting the message informing turning-off of the telematics terminal of the vehicle to the server responsive to determining that the power level of the battery reaches the predetermined reference value; and turning off the telematics terminal responsive to determining that an acknowledge message informing reception of the message is received from the server.

10. The remote control method according to claim 9, wherein the transmitting of the remote control signal to the low-power communication module of the vehicle, at the server, through the Ad-hoc network including the low-power communication module of the vehicle as the node includes:

at the server, responsive to determining that the message informing turning-off of the telematics terminal is received from the vehicle, transmitting the acknowledge message informing reception of the message to the telematics terminal of the vehicle; and at the server, transmitting the remote control signal to the low-power communication module of the vehicle through the Ad-hoc network.

11. The remote control method according to claim 9, further including, at the vehicle, performing control according to the remote control signal responsive to determining that the telematics terminal of the vehicle is turned on.

* * * * *